United States Patent
Jarvid et al.

(10) Patent No.: US 10,941,276 B2
(45) Date of Patent: Mar. 9, 2021

(54) POLYOLEFIN COMPOSITION FOR MEDIUM/HIGH/EXTRA HIGH VOLTAGE CABLES COMPRISING BENZIL-TYPE VOLTAGE STABILISER

(71) Applicant: BOREALIS AG, Vienna (AT)

(72) Inventors: Markus Jarvid, Nol (SE); Anette Johansson, Gothenburg (SE); Mats Andersson, Alafors (SE); Stanislaw Gubanski, Gothenburg (SE); Villgot Englund, Gothenburg (SE); Christian Muller, Gothenburg (SE); Jonas Mattiasson Bjuggren, Gothenburg (SE)

(73) Assignee: BOREALIS AG, Vienna (AT)

( * ) Notice: Subject to any disclaimer, the term of this patent is extended or adjusted under 35 U.S.C. 154(b) by 321 days.

(21) Appl. No.: 15/101,188

(22) PCT Filed: Dec. 2, 2014

(86) PCT No.: PCT/EP2014/003209
§ 371 (c)(1),
(2) Date: Jun. 2, 2016

(87) PCT Pub. No.: WO2015/090515
PCT Pub. Date: Jun. 25, 2015

(65) Prior Publication Data
US 2016/0304699 A1    Oct. 20, 2016

(30) Foreign Application Priority Data

Dec. 20, 2013  (EP) .................................. 13005981

(51) Int. Cl.
*C08K 5/12*     (2006.01)
*H01B 3/44*     (2006.01)
(Continued)

(52) U.S. Cl.
CPC ................ *C08K 5/12* (2013.01); *C08K 5/132* (2013.01); *C09K 15/06* (2013.01); *H01B 3/441* (2013.01)

(58) Field of Classification Search
CPC . C08K 5/12; C08K 5/132; C08K 5/07; C08K 5/10; C08K 5/103;
(Continued)

(56) References Cited

U.S. PATENT DOCUMENTS 4,190,602 A    2/1980 Brunisholz et al.
4,992,351 A *  2/1991 Ohkuma ................. C07C 45/00
                                              427/146

(Continued)

FOREIGN PATENT DOCUMENTS

| EP | 2 545 114 B1 | 8/2013 |
| RU | 2251170 | 4/2005 |
| WO | WO 93/08222 A1 | 4/1993 |

OTHER PUBLICATIONS

ChEBI 48076 acetyloxy group (http://www.ebi.ac.uk/chebi/searchId.do?chebiId=48076) (ChEBI). (Year: 2018).*

(Continued)

*Primary Examiner* — Laura C Powers
*Assistant Examiner* — Larissa Rowe Emrich
(74) *Attorney, Agent, or Firm* — Fay Sharpe LLP

(57) ABSTRACT

The present invention relates to a polyolefin composition comprising (A) a polyolefin, (B) a benzil derivative comprising, preferably consisting of, the structural unit according to the following formula (I) wherein $R_1$, $R_2$, $R_3$, $R_4$, $R_5$, $R_6$, $R_7$, $R_8$, $R_9$ and $R_{10}$ independently from each other are hydrogen, or a hydrocarbyl group which may contain heteroatoms or at least two of said $R_1$, $R_2$, $R_3$, $R_4$, $R_5$, $R_6$, $R_7$, $R_8$, $R_9$ and $R_{10}$ together with the ring atoms of the ring system of formula (I) they are attached to, form a further (Continued)

aromatic or non-aromatic ring fused to the ring system of formula (I) and at least $R_1$ or $R_2$ is an ester group. The invention also relates to a wire or cable, in particular a medium, high or extra high voltage cable, comprising such a composition, and to the use of such a composition for the production of a wire or cable, in particular a medium, high or extra high voltage cable.

20 Claims, 2 Drawing Sheets

(51) Int. Cl.
  *C09K 15/06* (2006.01)
  *C08K 5/132* (2006.01)

(58) Field of Classification Search
  CPC ............ C08K 5/105–107; C09K 15/06; H01B 3/441; H01B 3/00–56; C07C 49/796; C07C 49/83; C07C 45/71; C09B 35/233; C08J 3/22
  USPC .......................................................... 428/375
  See application file for complete search history.

(56) References Cited

U.S. PATENT DOCUMENTS 6,716,492 B1 *  4/2004  Moriya ................ B41J 11/0065
                                                          428/32.1

2013/0025910 A1    1/2013  Englund et al.
2013/0186670 A1    7/2013  Person

OTHER PUBLICATIONS

Jarvid et al., "Electrical Tree Inhibition by Voltage Stabilizers," Electrical Insulation and Dielectric Phenomena, 2012 Annual Report Conference, IEEE Xplore. (Year: 2012).*
Dodiuk, Hanna Goodman, Sidney H.. (2014). Handbook of Thermoset Plastics (3rd Edition). Elsevier. Retrieved fromhttps://app.knovel.com/hotlink/pdf/id:kt00C84SIU/handbook-thermoset-plastics/crosslinke-introduction (Year: 2014).*
"15. Crosslinking." Additives for Polyolefins, by Michael Tolinsky, Elsevier, 2009, pp. 215-220. (Year: 2009).*
Smedberg, A., et al. "Crosslinking Reactions in an Unsaturated Low Density Polyethylene." Polymer, vol. 38, No. 16, 1997, pp. 4127-4138., doi:10.1016/s0032-3861(96)00994-9. (Year: 1997).*
Ashcraft et al.; Laboratory Studies of Treeing in Solid Dielectrics and Voltage Stabilization of Polyethylene; IEEE International Symposium on Electrical Insulation; Montreal, Canada; 1978.
International Search Report for International Application No. PCT/EP2014/003209 dated Feb. 17, 2015.
Chinese First Office Action for Chinese Application No. 201480069240.5 dated Jul. 7, 2017.
International Preliminary Report on Patentability for International Application No. PCT/EP2014/003209 dated Jun. 30, 2016.

* cited by examiner

POLYOLEFIN COMPOSITION FOR MEDIUM/HIGH/EXTRA HIGH VOLTAGE CABLES COMPRISING BENZIL-TYPE VOLTAGE STABILISER

BACKGROUND

The present invention relates to a polyolefin composition with improved electrical breakdown strength obtained by increasing the electrical tree initiation, to the use of such a composition for the production of a wire or cable, in particular a medium, high or extra high voltage cable and to a wire or cable comprising said composition.

A typical medium voltage power cable, usually used for voltages from 6 to 72 kV, a typical high voltage cable used for voltages higher than 72 kV, and a typical extra high voltage cable used for voltages higher than 220 kV, comprises one or more conductors in a cable core that is surrounded by several layers of polymeric materials, including an inner semiconducting layer, followed by an insulating layer, and then an outer semiconducting layer. These layers are normally cross-linked. To these layers, further layers may be added, such as a metallic tape or wire shield, screens, and, finally, outermost jacketing layer(s). The layers of the cable are based on different types of polymer compositions. As insulating materials, today cross-linked polyolefins like cross-linked low density polyethylene are predominantly used.

It is a constant aim of cable manufacturers to increase the electrical breakdown strength of cable materials, in particular cable insulation materials, in order to achieve greater reliability or to develop new cable constructions where the insulation is subjected to higher stress. Defects in the insulation set a limit on the minimum insulation thickness and thereby maximum electrical design stress applied to the cable. To secure high reliability on high stress cable constructions it is known to reduce the amount of contaminants in the insulation material. However, nowadays already super clean materials are used for insulation, and improvements in electrical breakdown strength by further reduction of contaminants are associated with a significant increase in cost.

It is furthermore known to use active additives, the so called voltage stabilisers to increase the initiation level of electrical trees, in order to increase the electrical breakdown strength of cable insulation materials. In particular, EP 25 45114 discloses a general class of benzil derivative used to that purpose.

BRIEF SUMMARY

However, there is still the need for voltage stabilisers which improve the electrical breakdown strength of polyolefin compositions used for medium/high/extra high voltage cable insulation. Such voltage stabiliser compounds should usually have a low ionisation potential to decrease the energy of high energy electrons and hence increase the electrical breakdown strength efficiently (see e.g. A. C. Ashcraft, R. M. Eichhorn, and S.R.G., "Laboratory Studies of Treeing in Solid Dielectrics and Voltage Stabilization of Polyethylene" presented as I.E.E.E. International Symposium on Electrical Insulation, Montreal, Canada, 1978).

At the same time, the compounds must be soluble in the polyolefin, usually cross-linked polyethylene, used as a matrix polymer in the composition, and, furthermore, must show low migration tendency, so that the loss of the compound in the insulation material with time is as low as possible.

Still further, as usually insulating compositions are cross-linked polyolefins, the voltage stabiliser must as far as possible be compatible to commonly used cross-linking agents, such as organic peroxides, so that, on the one hand, the cross-linking process is not negatively affected, and, on the other hand, the voltage stabiliser is not reacting or decomposing which would reduce its efficiency or even, in the worst case, render it inactive. Of course, the voltage stabiliser should also be compatible in this sense with regard to all other components of the polyolefin composition.

It is thus an object of the invention, to provide a polyolefin composition comprising a voltage stabiliser for further improving the electrical breakdown strength of a polyolefin composition, especially for the use as an insulating composition in a medium/high/extra high voltage cable, which has the above-mentioned properties. In particular the voltage stabiliser provides a significant improvement on electrical tree initiation, has preferably also a good solubility in the polyolefin matrix and a low migration tendency, and more preferably is compatible with regard to other components of the polyolefin composition, in particular to cross-linking agents.

The above objects can be achieved by a polyolefin composition, a master batch both comprising specific benzil derivative as well as the use of said benzil derivative as a voltage stabiliser compound. By appropriately selecting the residues of the benzil derivative general formula disclosed in EP 25 45 114 improved performances are obtained.

DETAILED DESCRIPTION

Figure 1:
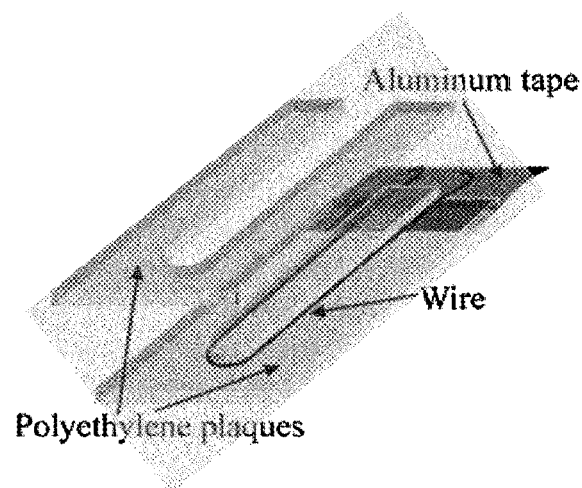
FIG. 1 is a schematic drawing showing a tungsten wire electrode between two of the pre-pressed polymer pieces and fastened with a piece of aluminium tape.

The present invention therefore provides a polyolefin composition comprising:
(A) a polyolefin,
(B) a benzil derivative comprising, preferably consisting of, the structural unit according to the following formula (I):

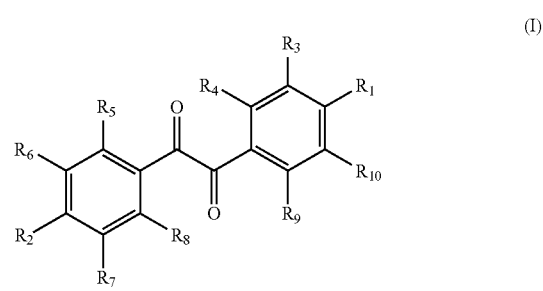

wherein
$R_1$, $R_2$, $R_3$, $R_4$, $R_5$, $R_6$, $R_7$, $R_8$, $R_9$ and $R_{10}$ independently from each other are hydrogen, or a hydrocarbyl group which may contain heteroatoms or at least two of said $R_1$, $R_2$, $R_3$, $R_4$, $R_5$, $R_6$, $R_7$, $R_8$, $R_9$ and $R_{10}$ together with the ring atoms of the ring system of formula (I) they are attached to, form a further aromatic or non-aromatic ring fused to the ring system of formula (I) and at least $R_1$ or $R_2$ is an ester group.

The term "hydrocarbyl group" denotes any substituent which is composed of carbon and hydrogen atoms regardless of the degree of saturation, e.g. alkyl groups, alkenyl groups, alkinyl groups and aromatic groups composed of C and H. Where it is indicated that a hydrocarbyl group may contain heteroatoms these are atoms different from C and H, such as Si, N, P, O or S, typically N or O. Conveniently, the heteroatom is selected from the group consisting of Si, N, P, O and S.

Preferably, $R_1$ and $R_2$ are both ester groups. Most preferably $R_1$ and $R_2$ are the same ester group.

The ester group preferably contains from 2 to 30 carbon atoms, even more preferably from 2 to 20 carbon atoms.

The ester group is conveniently selected from the group consisting of $CH_3CO_2$—, $C_2H_5CO_2$—, $C_3H_7CO_2$—, $C_4H_9CO_2$—, $C_5H_{11}CO_2$—, $C_6H_{13}CO_2$—, $C_7H_{15}CO_2$—, $C_8H_{17}CO_2$—, $C_9H_{19}CO_2$—, $C_{10}H_{21}CO_2$—, $C_{11}H_{23}CO_2$—, $C_{12}H_{25}CO_2$—, $C_{13}H_{27}CO_2$—, $C_{14}H_{29}CO_2$—, $C_{15}H_{31}CO_2$—, $C_{16}H_{33}CO_2$—, $C_{17}H_{35}CO_2$—, $C_{18}H_{37}CO_2$— and $C_{19}H_{39}CO_2$—.

The ester group is preferably selected from the group consisting of $CH_3CO_2$—, $C_2H_5CO_2$—, $C_3H_7CO_2$—, $C_4H_9CO_2$—, $C_5H_{11}CO_2$—, $C_6H_{13}CO_2$—, $C_7H_{15}CO_2$—, $C_8H_{17}CO_2$—, $C_9H_{19}CO_2$—, $C_{10}H_{21}CO_2$— and $C_{11}H_{23}CO_2$—.

Advantageously, $R_3$, $R_4$, $R_5$, $R_6$, $R_7$, $R_8$, $R_9$ and $R_{10}$ are hydrogen.

Alternatively at least one of $R_3$, $R_4$, $R_5$, $R_6$, $R_7$, $R_8$, $R_9$ and $R_{10}$ is an alkyl group or at least two of said $R_3$, $R_4$, $R_5$, $R_6$, $R_7$, $R_8$, $R_9$ and $R_{10}$ together with the ring atoms of the ring system of formula (I) they are attached to, form a further aromatic ring fused to the ring system of formula (I). In that case preferably the remaining residues of $R_3$, $R_4$, $R_5$, $R_6$, $R_7$, $R_8$, $R_9$ and $R_{10}$ are hydrogen.

According to a preferred embodiment $R_1$ and $R_2$ are $CH_3CO_2$— and $R_3$, $R_4$, $R_5$, $R_6$, $R_7$, $R_8$, $R_9$ and $R_{10}$ are hydrogen.

According to another preferred embodiment $R_1$ and $R_2$ are $C_{11}H_{23}CO_2$— and $R_3$, $R_4$, $R_5$, $R_6$, $R_7$, $R_8$, $R_9$ and $R_{10}$ are hydrogen.

It has now been found that the use of the specific benzil derivative (B) compounds described above as voltage stabiliser yields insulating polyolefin compositions with significantly improved electrical breakdown strength and are compatible with the other components of the polyolefin composition, in particular with cross-linking agents.

Furthermore, preferably the compounds comprising, or consisting of, a structural unit according to formula (I) are free of halogen substituents or substituents containing halogen atoms.

It is preferred in all of the above embodiments that the benzil derivative (B) consists of the structural unit described for the particular embodiment. However, for all cases where the aromatic system(s) of formula (I) contain at least two substituents, it is also possible that structural units of any of the above described embodiments are made into oligomeric structures, to increase the molecular weight.

It is furthermore possible and also within the scope of the invention to attach the compound (B) to one or more further components of the polyolefin composition of the invention, e.g. to attach it to polyolefin (A).

This may be done by copolymerising voltage stabiliser-containing comonomers and "regular" monomers of e.g. polyolefin (A), or by grafting of suitable voltage stabiliser compounds onto a polymer backbone.

Preferably, compound (B) is present in the composition in an amount of 0.001 to 10 wt %, more preferably 0.01 to 5 wt. %, still more preferably from 0.05 to 4 wt. %, still more preferably 0.1 to 3 wt. %, and most preferably from 0.1 to 2 wt. %. Further preferred ranges for compound (B) present in the composition are 0.05 to 3 wt. %, 0.05 to 2 wt. % or 0.05 to 1.5 wt. %.

Polyolefin (A) may be any polyolefin material suitable to be used for the production of a layer of cable, preferably power cable layer, more preferably an insulation layer of a power cable.

Polyolefin (A) preferably comprises, or consists of, a polyethylene or polypropylene. Where herein it is referred to a "polymer", e.g. polyethylene, this is intended to mean both a homo- and copolymer, e.g. an ethylene homo- and copolymer.

Where polyolefin (A) comprises, or consists of, a polyethylene, the polymer may be produced in a high pressure process or in a low pressure process in the presence of a catalyst, for example chromium, Ziegler-Natta or single-site catalyst.

Where polyolefin (A) comprises, or consists of, a polypropylene, this may be homo- or copolymer and/or a heterophasic polypropylene.

Furthermore, where polyolefin (A) comprises, or consists of, a polypropylene, it is preferred that it has an $MFR_2$ (230° C., 2.16 kg) of from 0.001 to 25 g/10 min.

In a preferred embodiment, polyolefin (A) comprises or consists of an ethylene homo- or copolymer. In the case of an ethylene copolymer, it is preferred that it includes 0.001 to 50 wt %, more preferably 0.1 to 40 wt %, still more preferably 0.1 to 35 wt %, still more preferably 0.1 to 30 wt %, even more preferably 0.1 to 25 wt % of one or more comonomers.

Preferably, the density of the ethylene homo or- copolymer is higher than 0.860 $g/cm^3$.

Furthermore, preferably the density of the ethylene homo or- copolymer is not higher than 0.960 $g/cm^3$.

The $MFR_2$ (2.16 kg, 190° C.) of the ethylene homo or- copolymer preferably is from 0.01 to 50 g/10 min, more preferably is from 0.1 to 20 g/10 min, still more preferably is from 0.2 to 15 g/10 min, and most preferably is from 0.2 to 10 g/10 min.

Still further, it is preferred that polyolefin (A) comprises or consists of a polyethylene which has been produced by a high pressure process using free radical polymerization resulting in preferably a cross-linkable polyethylene. The polymerization generally is performed at pressures of 120 to 350 MPa and at temperatures of 150 to 350° C.

The cross-linkable polyethylene may be an ethylene homopolymer or a copolymer of ethylene.

As a comonomer in the ethylene copolymer, a non-polar alpha-olefin may be used, either alone or in addition with further types of comonomers. Such alpha-olefins may also comprise further unsaturation present e.g. in polyunsaturated comonomers such as dienes.

Preferred non polar alpha olefins are $C_3$-$C_{20}$ alpha olefins, preferably $C_3$ to $C_{10}$ alpha-olefins are used as comonomers, such as propylene, 1-butene, 1-hexene, 4-methyl-1-pentene, styrene, 1-octene, 1-nonene, polyunsaturated comonomers preferably $C_8$ to $C_{14}$ non-conjugated dienes, such as a $C_8$ to $C_{14}$ non-conjugated diene, e.g. 1,7-octadiene, 1,9-decadiene, 1,11-dodecadiene, 1,13-tetradecadiene, or any mixture thereof. Further examples of polyunsaturated comonomers are dienes like 7-methyl-1,6-octadiene, 9-methyl-1,8-decadiene, or mixtures thereof.

It is also possible to use polar comonomers, optionally in combination with the non polar alpha olefin comonomer(s). Preferably, as polar monomer units, compounds containing hydroxyl groups, alkoxy groups, carbonyl groups, carboxyl groups, ether, and ester groups are used.

Still more preferably, the polar monomer units are selected from the group of alkyl acrylates, alkyl methacrylates, and vinyl acetates or mixtures therefrom. Further preferred, the comonomers are selected from $C_1$- to $C_6$-alkyl acrylates, $C_1$- to $C_6$-alkyl methacrylates, and vinyl acetate. Still more preferably, the polar copolymer comprises a copolymer of ethylene with $C_1$- to $C_4$-alkyl, such as methyl, ethyl, propyl or butyl acrylates or vinyl acetate, or any mixture thereof.

If polar comonomer units are present in polyolefin (A) it is preferred that the amount is as defined above and below.

If the cross-linkable polyethylene is a copolymer, it is preferred that it includes 0.001 to 50 wt %, more preferably 0.1 to 40 wt %, still more preferably 0.1 to 35 wt %, still more preferably 0.1 to 30 wt %, even more preferably 0.1 to 25 wt %, of one or more comonomers.

Polyolefin (A) preferably is cross-linkable. Cross-linking may be achieved e.g. by further including a cross-linking agent into the composition or by the incorporation of cross-linkable groups into polyolefin (A).

In a preferred embodiment, the polymer composition according to the present invention further comprises a cross-linking agent.

In the context of the present invention, a cross-linking agent is defined to be any compound capable to generate radicals which can initiate a cross-linking reaction. Preferably, the cross-linking agent contains at least one —O—O— bond or at least one —N═N— bond.

The cross-linking agent, e.g. a peroxide, is preferably added in an amount of less than 10 wt %, more preferably 0.05 to 5.0 wt %, still more preferably 0.05 to 3.0 wt %, even more preferably 0.05 to 2.6 wt %, based on the weight of the cross-linkable polymer composition.

As peroxides as non-limiting examples of cross-linking agents are i.a. di-tert-amylperoxide, 2,5-di(tert-butylperoxy)-2,5-dimethyl-3-hexyne, 2,5-di(tert-butylperoxy)-2,5-dimethylhexane, tert-butylcumylperoxide, di(tert-butyl)peroxide, dicumylperoxide, bis(tertbutylperoxyisopropyl) benzene, butyl-4,4-bis(tert-butylperoxy)-valerate, 1,1-bis(tert-butylperoxy)-3,3,5-trimethylcyclohexane, tert-butylperoxybenzoate, dibenzoylperoxide, 2,5-dimethyl-2,5-di(benzoylperoxy)hexane, 1,1-di(tert-butylperoxy)cyclohexane, 1,1-di(tert amylperoxy)cyclohexane, or any mixtures thereof.

Preferably, the peroxide is selected from 2,5-di(tert-butylperoxy)-2,5-dimethyl-hexane, di(tert-butylperoxy-isopropyl)benzene, dicumylperoxide, tert-butylcumylperoxide, di(tert-butyl)peroxide, or mixtures thereof. Most preferably, the peroxide is dicumylperoxide.

It is preferred that cross-linking is effected by including a cross-linking agent, such as a peroxide in any of the above mentioned embodiments, into the composition.

However, cross-linking may also be achieved by hydrolysable silane groups which may be present in polyolefin (A). Thus, polyolefin (A) may also comprise or consist of a cross-linkable polyolefin containing hydrolysable silane groups. Hydrolysable silane groups are typically crosslinked by a condensation catalyst in the presence of water.

The hydrolysable silane groups may be introduced into the polyolefin by copolymerisation of e.g. ethylene monomers with silane group containing comonomers or by grafting, i.e. by chemical modification of the polymer by addition of silane groups mostly in a radical reaction. Both techniques are well known in the art.

In case polyolefin (A) comprises or consists of an unsaturated polyolefin, i.e. a polyolefin comprising carbon-carbon double bonds, then preferably the polyolefin has a total amount of carbon-carbon double bonds/1000 carbon atoms of 0.1 or more, more preferably of 0.2 or more, still more preferably of 0.3 or more, and most preferably more than 0.37.

The upper limit of the amount of carbon-carbon double bonds present in the polymer is not limited and may preferably be less than 5.0/1000 carbon atoms, preferably less than 3.0/1000 carbon atoms, or more preferably less than 2.5/1000 carbon atoms.

When used in combination with the unsaturated polyolefin, the term "total amount of carbon-carbon double bonds" refers to those double bonds originating from vinyl groups, vinylidene groups and trans-vinylene groups. The amount of each type of double bond is measured as indicated in the experimental part.

The incorporation of the total amount of carbon-carbon double bonds within the polyolefin component enables to accomplish improved cross-linking properties.

The total amount of vinyl groups is preferably higher than 0.02/1000 carbon atoms, more preferably higher than 0.05/1000 carbon atoms, still more preferably higher than 0.08/1000 carbon atoms, and most preferably higher than 0.11/1000 carbon atoms.

Preferably, the total amount of vinyl groups is lower than 4.0/1000 carbon atoms.

Preferred unsaturated polyolefin (A) is an unsaturated polyethylene and more preferably an unsaturated homo or copolymer or even more preferably an unsaturated low density polyethylene (LDPE) homo or copolymer.

Preferably, the unsaturated polyolefin is prepared by copolymerising at least one olefin monomer with at least one polyunsaturated comonomer.

In a preferred embodiment, the polyunsaturated comonomer consists of a straight carbon chain with at least 8 carbon atoms and at least 4 carbon atoms between the non-conjugated double bonds, of which at least one is terminal.

Siloxanes having the following formula:

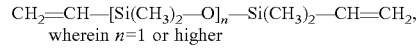

wherein $n=1$ or higher may also be used as a polyunsaturated comonomer. As an example, divinylsiloxanes, e.g. alpha,omega-divinylsiloxane, can be mentioned.

In addition to the polyunsaturated comonomer, further comonomers can optionally be used, preferably non polar $C_3$-$C_{20}$ alpha olefin comonomers, more preferably $C_3$ to $C_{10}$ alpha-olefin comonomers without further unsaturation, such as propylene, 1-butene, 1-hexene, 4-methyl-1-pentene, styrene, 1-octene, and/or 1-nonene, polar comonomers or any mixture thereof.

It is also possible to use polar comonomers, optionally in combination with the non polar alpha olefin comonomer(s). Preferably, as polar monomer units, compounds containing hydroxyl groups, alkoxy groups, carbonyl groups, carboxyl groups, ether, and ester groups are used.

Still more preferably, the polar monomer units are selected from the group of alkyl acrylates, alkyl methacrylates, and vinyl acetates or mixtures therefrom. Further preferred, the comonomers are selected from $C_1$- to $C_6$-alkyl acrylates, $C_1$- to $C_6$-alkyl methacrylates, and vinyl acetate. Still more preferably, the polar copolymer comprises a copolymer of ethylene with $C_1$- to $C_4$-alkyl, such as methyl, ethyl, propyl or butyl acrylates or vinyl acetate, or any mixture thereof.

If polar comonomer units are present in polyolefin (A) it is preferred that the amount is as defined above.

When preparing the unsaturated polyolefin such as an unsaturated polyethylene in a high pressure process, the polymerisation is generally performed at pressures in the range of 120 to 350 MPa and at temperatures in the range of 150 to 350° C.

In a preferred embodiment, the polyolefin (A) as polyethylene or the preferably unsaturated polyethylene contains at least 50 wt % ethylene monomer units.

Polyethylene, or preferably unsaturated polyethylene, of low density is preferred.

In addition to the components polyolefin (A) and aromatic compound (B), the polymer composition may further comprise components, which may, for example, be any type of other polymer.

The polymer composition of the invention may further comprise a polar copolymer (C).

Polar copolymers (C) preferably are olefin copolymers, more preferably propylene or ethylene copolymers containing polar comonomers preferably the ones defined above.

Optionally, the polymer composition comprises a scorch retarder. In the context of the present invention, a "scorch retarder" is defined to be a compound that reduces the formation of scorch during extrusion of a polymer composition, at typical extrusion temperatures used, if compared to the same polymer composition extruded without said compound. Besides scorch retarding properties, the scorch retarder may simultaneously result in further effects like boosting, i.e. enhancing cross-linking performance during the cross-linking step.

Preferred scorch retarders are unsaturated dimers of aromatic alpha-methyl alkenyl monomers, such as 2,4-di-phenyl-4-methyl-1-pentene, substituted or unsubstituted diphenylethylene, quinone derivatives, hydroquinone derivatives, monofunctional vinyl containing esters and ethers, monocyclic hydrocarbons having at least two or more double bonds, or mixtures thereof. More preferably, the scorch retarder is selected from 2,4-diphenyl-4-methyl-1-pentene, substituted or unsubstituted diphenylethylene, or mixtures thereof.

Preferably, the amount of scorch retarder is within the range of 0.005 to 1.0 wt %, more preferably within the range of 0.01 to 0.8 wt %, based on the weight of the cross-linkable polyolefin composition. Further preferred ranges are 0.03 to 0.75 wt %, 0.05 to 0.70 wt % and 0.05 to 0.50 wt %, based on the weight of the cross-linkable polyolefin composition.

The polymer composition may contain further additives, such as antioxidant(s), stabiliser(s), processing aid(s), and/or cross-linking booster(s). As antioxidant, sterically hindered or semi-hindered phenols, aromatic amines, aliphatic sterically hindered amines, organic phosphates, thio compounds, and mixtures thereof, can be mentioned.

Typical cross-linking boosters may include compounds containing at least 1, preferably at least 2, unsaturated groups, e.g. vinyl or an allyl groups, such as an aliphatic or aromatic compound, an ester, an ether, or a ketone, which contains at least 1, preferably at least 2, unsaturated group(s), such as a cyanurate, an isocyanurate, a phosphate, an ortho formate, an aliphatic or aromatic ether, or an allyl ester of benzene tricarboxylic acid. Examples of esters, ethers and ketones are compounds selected from general groups of diacrylates, triacrylates, tetraacrylates, triallylcyanurate, triallylisocyanurate, or any mixtures thereof, e.g. triallylcyanurate, triallylisocyanurate, and di-, tri- or tetraacrylates.

As further additives, flame retardant additives, acid scavengers, inorganic filler(s), preferably selected from carbon black or flame retardant filler, water-tree retardant(s) and other voltage stabiliser(s) can be mentioned.

If an antioxidant, optionally a mixture of two or more antioxidants, is used, the added amount can range from 0.005 to 2.5 wt %, based on the weight of the polymer composition.

In general, if a polyethylene is used in the composition, the antioxidant(s) are preferably added in an amount of 0.005 to 1.5 wt %, more preferably, 0.01-1.2 wt %, even more preferably 0.02 to 0.80 wt %, based on the weight of the polymer composition.

Similarly, if a polypropylene is used in the composition, the antioxidant(s) are preferably added in an amount of 0.005 to 2 wt %, more preferably 0.01 to 1.5 wt %, even more preferably 0.05 to 1 wt %, based on the weight of the polymer composition.

Further additive(s) may be present in an amount of 0.001 to 5 wt %, more preferably 0.005 to 3 wt %, and still more preferably 0.005 to 2 wt %, based on the weight of the polymer composition. Flame retardant additives and inorganic fillers can be added in higher amounts.

If used for semiconductive layers, the composition may comprise carbon black in usual amounts, preferably in an amount of from 10 to 60 wt %, more preferably from 20 to 50 wt %.

The $MFR_2$ (2.16 kg, 190° C.) of the polymer composition preferably is from 0.01 to 50 g/10 min, more preferably is from 0.1 to 20 g/10 min, and most preferably is from 0.2 to 10 g/10 min when no inorganic filler is present.

The polyolefin (A) and the compound (B), optionally in combination with one or more optional additives discussed above, can be blended by any conventional blending technique to result in the polymer composition of the invention.

The polymer composition preferably contains carbon-carbon double bonds in an amount of at least 0.1/1000 carbon atoms, or preferably at least 0.2/1000 carbon atoms or more preferred 0.30/1000 carbon atoms. The upper limit of the amount of carbon-carbon double bonds present in the polymer composition is not limited and may preferably be of less than 5.0/1000 carbon atoms, preferably of less than 3.0/1000 carbon atoms, or more preferably of less than 2.5/1000 carbon atoms.

The total amount of double bonds of the cross-linkable polymer composition is based on vinyl, vinylidene and trans-vinylene groups/1000 carbon atoms of component (A) and/or any further components in the polymer composition comprising such groups.

C—C double bonds present in the polymer composition include vinyl groups and the total amount of said vinyl groups is, in the given preference order, of at least 0.02/1000 carbon atoms, at least 0.05/1000 carbon atoms, at least 0.08/1000 carbon atoms, at least 0.10/1000 carbon atoms, or of at least 0.11/1000 carbon atoms.

The upper limit of the total amount of the vinyl groups present in the polymer composition is typically, in the given preference order, of up to 4.0/1000 carbon atoms, of up to 3.0/1000 carbon atoms, up to 2.5/1000 carbon atoms, or of up to 2.0/1000 carbon atoms.

Accordingly, the total amount the vinyl groups, if present, contributes to the total amount of C—C double bonds present in the polymer composition. The total amount of vinyl groups can e.g. consist of any the above mentioned vinyl groups from the polymer and, if present, added other additives such as boosters, scorch retarders or other further additive(s).

From the polymer composition described above, a cross-linked composition can be prepared by blending with a cross-linking agent, followed by treatment under cross-linking conditions, thereby increasing the cross-linking level. Cross-linking can be effected by treatment at increased temperature, e.g. at a temperature of at least in the range of 150-160° C. When peroxides are used, cross-linking is generally initiated by increasing the temperature to the decomposition temperature of the corresponding peroxide. When the peroxide decomposes, radicals are generated from the peroxide. These radicals then initiate the cross-linking reaction.

The total amount of additive(s) in the polyolefin composition according to the invention is generally 0.05 to 15 wt %, preferably 0.1 to 12 wt %, more preferably 0.1 to 10 wt %.

From the polymer composition of the present invention, a multilayered article can be prepared wherein at least one layer comprises said polymer composition. When cross-linking is initiated, a cross-linked multilayered article is obtained. Preferably, the multilayered article (either cross-linked or not) is a cable, preferably a power cable.

In the context of the present invention, a power cable is defined to be a cable transferring energy operating at any voltage. The voltage applied to the power cable can be alternating (AC), direct (DC), or transient (impulse).

In a preferred embodiment, the multilayered article is a power cable operating at voltages higher than 1 kV. In other preferred embodiments, the power cable prepared according to the present invention is operating at 6 kV or higher.

The power cable can be prepared in a process wherein the composition of the present invention, optionally in combination with a cross-linking agent, is applied onto a substrate by extrusion. In such an extrusion process, the sequence of mixing the components of the composition can be varied, as explained below.

According to a preferred embodiment, the polyolefin (A), optionally in combination with other polymer component(s), and the compound (B) are mixed with each other and possibly with further additive(s), either on solid pellets or powder of the different polymer components or by melt mixing, followed by forming pellets from the melt.

Subsequently, if used, the cross-linking agent, preferably peroxide, and optionally a scorch retarder and/or a cross-linking booster are added to the pellets or powder in a second step. Alternatively, the scorch retarder and/or cross-linking booster could already be added in the first step, together with the additives. The final pellets are fed to the extruder, e.g. a cable extruder.

According to another preferred embodiment, instead of a two-step process, the polyolefin (A) and any further polymeric component(s) of the composition, preferably in the form of pellets or powder, compound (B) and, optionally, the further additives, cross-linking agent, and/or scorch retarder, are added to a compounding extruder, single or twin screw. Preferably, the compounding extruder is operated under careful temperature control.

According to another preferred embodiment, a mix of compound (B) with all other additives, i.e. including anti-oxidant (s) and cross-linking agent and optionally a scorch retarder and/or further additives such as a cross-linking booster, are added onto the pellets or powder made of the polyolefin (A) and optionally other polymer component(s).

According to another preferred embodiment, pellets made of the polyolefin (A) and compound (B), optionally further containing further polymeric components and additional further additive(s), are prepared in a first step, e.g. by melt mixing. These pellets, obtained from the melt mixing, are then fed into the cable extruder. Optionally, subsequently, cross-linking agent and optionally a scorch retarder and/or a cross-linking booster are either fed prior to the hopper, in the hopper or directly into the cable extruder and optionally together with further polymeric components if they have not been added in the first step. Alternatively, cross-linking agent and/or scorch retarder and/or cross-linking booster are already added to the pellets before feeding these pellets into the cable extruder or only the crosslinking agent is added prior to the hopper, in the hopper or directly in the cable extruder if all other components already have been added in earlier step(s).

According to another preferred embodiment, pellets made of the polyolefin (A) and any further polymeric component(s) without any additional further component(s) are fed to the extruder. Subsequently, compound (B) and optionally antioxidant(s), cross-linking agent(s) and optionally a scorch retarder, optionally in combination further additive(s) such as a cross-linking booster, are either fed in the hopper or directly fed into the polymeric melt within the cable extruder. The compound (B) could be added in this step instead, together with the antioxidant(s), cross-linking agent, scorch retarder and the other optional additives used. Alternatively, one or more of these components, i.e. cross-linking agent, scorch retarder, cross-linking booster, antioxidant(s), compound (B) or a mixture of these components is already added to the pellets before feeding these pellets into the cable extruder, e.g. the components not already present in the fed pellets that should be present in the cable needs to be added at any position in the cable extrusion step.

According to another preferred embodiment, the compound (B) as described above for the polymer composition can also be provided in a master batch which comprises at least a matrix polymer and the compound (B). Compound (B) could also be present in the pellets and antioxidant (s), crosslinking agent etc could be added in one or more masterbatches.

The present invention is also therefore directed to a master batch comprising a matrix polymer, and a benzil derivative (B) comprising, preferably consisting of, the structural unit according to formula (I) in all the embodiments as defined above in the context of the polymer composition of the invention.

The master batch is then added to or mixed with the polyolefin (A) and possibly further polymer components and further processed in a known manner to produce an article, such as power cable.

When producing a power cable by extrusion, the polymer composition can be applied onto the metallic conductor and/or at least one coating layer thereof, e.g. a semiconductive layer or insulating layer. Typical extrusion conditions are mentioned in WO 93/08222.

Compounding may be performed by any known compounding process, including extruding the final product with a screw extruder or a kneader.

The present invention furthermore relates to a wire or cable, comprising the polyolefin composition in any of the above described embodiments.

In a preferred embodiment, the invention relates to a medium, high or extra high voltage cable comprising one or more conductors in a cable core, an inner semiconducting layer, followed by an insulating layer, and then an outer semiconducting layer, wherein at least one of these layers, preferably the insulating layer, comprises the polyolefin composition as described above.

The term "conductor" means herein above and below that the conductor comprises one or more wires. Moreover, the cable may comprise one or more such conductors. Preferably the conductor is an electrical conductor.

One or more of those layers may also be cross-linked.

In addition to the semiconductive and insulating layers, further layers may be present in medium, high or extra high voltage cables, such as a metallic tape or wire shield, screen(s) and, finally, outermost jacketing layer(s).

The invention relates furthermore to the use of the polyolefin composition in any of the above described embodiments for the production of a layer of a wire or cable, preferably of a layer, more preferably an insulating layer, of a medium, high or extra high voltage cable.

The polyolefin composition according to the present invention comprising the above voltage stabiliser compound is improved especially in electrical breakdown strength and thus achieving an excellent molal voltage stabilisation, measured in the electrical tree testing method described below. This behaviour renders the polyolefin compositions of the present invention highly suitable for the use as medium/high/extra high voltage cable insulation.

Preferred embodiments of this polyolefin composition are those comprising the above described compounds (A) and (B) in any of their above-described embodiments and amounts.

Finally, the invention relates to the use of the benzil derivative (B) as in all the embodiments described above in the context of the polymer composition of the invention as a voltage stabiliser in a polyolefin composition.

Measurement Methods a) Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 190° C. for polyethylenes and may be determined at different loadings such as 2.16 kg ($MFR_2$) or 21.6 kg ($MFR_{21}$). The MFR is determined at 230° C. for polypropylenes.

b) Determination of the Amount of Double Bonds

A) Quantification of the Amount of Carbon-Carbon Double Bonds by IR Spectroscopy Quantitative infrared (IR) spectroscopy is used to quantify the amount of carbon-carbon doubles (C=C) bonds. Calibration is achieved by prior determination of the molar extinction coefficient of the C=C functional groups in representative low molecular weight model compounds of known structure.

The amount of each of these groups (N) is defined as number of carbon-carbon double bonds per thousand total carbon atoms (C=C/1000C) via:

$$N=(A \times 14)/(E \times L \times D)$$

where A is the maximum absorbance defined as peak height, E the molar extinction coefficient of the group in question ($l \cdot mol^{-1} \cdot mm^{-1}$), L the film thickness (mm) and D the density of the material ($g \cdot cm^{-1}$).

The total amount of C=C bonds per thousand total carbon atoms can be calculated through summation of N for the individual C=C containing components.

For polyethylene samples solid-state infrared spectra are recorded using a FTIR spectrometer (Perkin Elmer 2000) on compression moulded thin (0.5-1.0 mm) films at a resolution of 4 $cm^{-1}$ and analysed in absorption mode.

All quantification is undertaken using the absorption of the C=C—H out-of-plain bend between 910 and 960 cm-1. The specific wave number of the absorption is dependent on the chemical structure of the unsaturation containing species.

1) Polymer Compositions Comprising Polyethylene Homopolymers and Copolymers, Except Polyethylene Copolymers with >0.4 wt % Polar Comonomer For polyethylenes three types of C=C containing functional groups are quantified, each with a characteristic absorption and each calibrated to a different model compound resulting in individual extinction coefficients:

vinyl (R—CH=CH2) via 910 $cm^{-1}$ based on 1-decene [dec-1-ene] giving E=13.13 $l \cdot mol^{-1} \cdot mm^{-1}$ vinylidene (RR'C=CH2) via 888 $cm^{-1}$ based on 2-methyl-1-heptene [2-mehyhept-1-ene] giving E=18.24 $l \cdot mol^{-1} \cdot mm^{-1}$ trans-vinylene (R—CH=CH—R') via 965 $cm^{-1}$ based on trans-4-decene [(E)-dec-4-ene] giving E=15.14 $l \cdot mol^{-1} \cdot mm^{-1}$ For polyethylene homopolymers or copolymers with <0.4·wt % of polar comonomer linear baseline correction is applied between approximately 980 and 840 $cm^{-1}$.

2) Polymer Compositions Comprising Polyethylene Copolymers with >0.4 wt % Polar Comonomer For polyethylene copolymers with >0.4 wt % of polar comonomer two types of C=C containing functional groups are quantified, each with a characteristic absorption and each calibrated to a different model compound resulting in individual extinction coefficients:

vinyl (R—CH=CH2) via 910 $cm^{-1}$ based on 1-decene [dec-1-ene] giving E=13.13 $l \cdot mol^{-1} \cdot mm^{-1}$ vinylidene (RR'C=CH2) via 888 $cm^{-1}$ based on 2-methyl-1-heptene [2-methyhept-1-ene] giving E=18.24 $l \cdot mol^{-1} \cdot mm^{-1}$

EBA:

For poly(ethylene-co-butylacrylate) (EBA) systems linear baseline correction is applied between approximately 920 and 870 $cm^{-1}$.

EMA:

For poly(ethylene-co-methylacrylate) (EMA) systems linear baseline correction was applied between approximately 930 and 870 $cm^{-1}$.

3) Polymer Compositions Comprising Unsaturated Low Molecular Weight Molecules

For systems containing low molecular weight C=C containing species direct calibration using the molar extinction coefficient of the C=C absorption in the low molecular weight species itself is undertaken.

B) Quantification of Molar Extinction Coefficients by IR Spectroscopy

The molar extinction coefficient is determined according to the procedure given in ASTM D3124-98 and ASTM D6248-98. Solution-state infrared spectra are recorded using a FTIR spectrometer (Perkin Elmer 2000) equipped with a 0.1 mm path length liquid cell at a resolution of 4 $cm^{-1}$.

The molar extinction coefficient (E) was determined as $l \cdot mol^{-1} \cdot mm^{-1}$ via:

$$E=A/(C \times L)$$

where A is the maximum absorbance defined as peak height, C the concentration ($mol \cdot l^{-1}$) and L the cell thickness (mm).

At least three 0.18 $mol \cdot l^{-1}$ solutions in carbon disulphide ($CS_2$) are used and the mean value of the molar extinction coefficient determined.

c) Determination of the Vinyl Content Originating from the Polyunsaturated Compound The amount of vinyl groups originating from the polyunsaturated comonomer per 1000 carbon atoms was determined and calculated as follows: The polymer to be analysed and a reference polymer have been produced on the same reactor, basically using the same conditions, i.e. similar peak temperatures, pressure and production rate, but with the only difference that the polyunsaturated comonomer is added to polymer to be analysed and not added to reference polymer. The total amount of vinyl groups of each polymer was determined by FT-IR measurements, as described above. Then, it is assumed that the base level of vinyl groups, i.e. the ones formed by the process and from chain transfer agents resulting in vinyl groups (if present), is the same for the reference polymer and the polymer to be analysed with the only exception that in the polymer to be analysed also a polyunsaturated comonomer is added to the reactor. This base level is then subtracted from the measured amount of vinyl groups in the polymer to be analysed, thereby resulting in the amount of vinyl groups/1000 carbon atoms, which result from the polyunsaturated comonomer.

d) Density

Density of the polymer was measured according to ISO 1183/D.

EXAMPLES

The following examples serve to further illustrate the present invention. Unless otherwise specified all the reagents are commercially available or can be produced according to methods well known in the literature.

Inventive Example 1 (IE1)

Composition Comprising
4,4'-Dihydroxybenzildiacetate (Formula II)

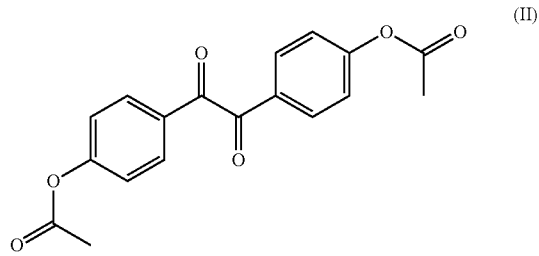 [SMILES: CC(=O)Oc1ccc(C(=O)C(=O)c2ccc(OC(C)=O)cc2)cc1]

(II)

Inventive Example 2 (IE2)

Composition Comprising
4,4'-Dihydroxybenzildidodecanoate (Formula III)

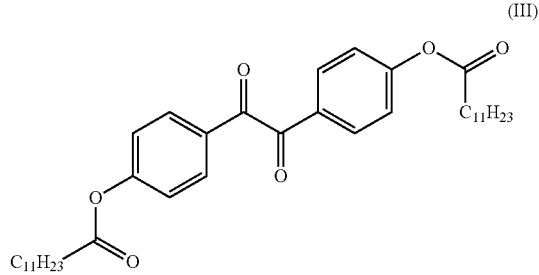

(III)

Production and Testing of Compositions

The compositions of the invention (inventive example 1 and 2) are tested together with a reference polymer comprising 4,4'-didodecyloxybenzil (Comparative Example 2) (CE2) described in EP 25 45114 as voltage stabilizer. A polymer without voltage stabilizer is used as base reference material (Comparative Example 1) (CE1).

The test arrangements are the same for the reference polymers and for the inventive compositions.

A commercially available cross-linkable polyethylene with the grade name, LS4201S, supplied by Borealis, Sweden, which is prepared by high pressure polymerization and had a density of 0.922 g/cm$^3$ (ISO1872-2/ISO1183-2), MFR$_2$ (ISO 1133, load 2.16 kg, at 190° C.) of 2 g/10 min (CE1) is used as base reference polymer and as the polymer for preparing the compositions of CE2 and IE1-2.

The base reference polymer is in a form of pellets which contains dicumyl peroxide as a cross-linking agent. Before use, the pellets are ground to fine powder in a Retsch ZM-1centrifugal mill with a 500 micrometer sieve. In the cases where voltage stabilizers are added, the powder is impregnated with the stabilizer dissolved in dichloromethane for one hour while agitated manually for about 30 s every 15 minutes. The solvent is then removed by means of rotary evaporation and vacuum oven to obtain a dry powder with a homogeneously distributed voltage stabiliser.

The test objects are prepared by compression moulding in two steps. In the first step, the polyethylene powder is formed to suitable shapes by melting at 130° C. and 10 kN press force for three minutes followed by 200 kN during another three minutes. A tungsten wire electrode with a diameter of 10 μm is then applied between two of the pre-pressed polymer pieces (30 mm×14 mm×1.5 mm) and fastened with a piece of aluminum tape used as high voltage connection during the electrical treeing tests as shown in FIG. 1. In the second step the material is first melted at 130° C. during fifteen minutes to reduce the influence of interfaces between the pre-pressed blocks after which the temperature is ramped up to 180° C. and held for fifteen minutes for cross linking to take place. The press force is increased to 200 kN during the cross linking to inhibit the formation of gas filled voids from the cross linking byproducts.

Figure 2:
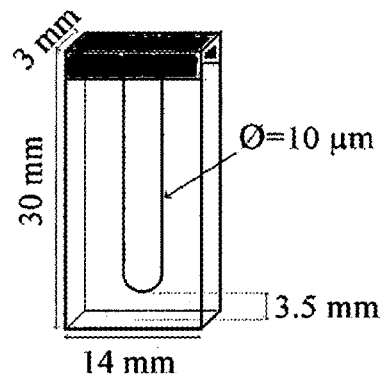
FIG. 2 is a schematic drawing showing a wire electrode test object.

This procedure yield the wire electrode test object illustrated in FIG. 2. To make the thermal history of the test objects as similar as possible, the samples are remelted at 130° C. in an oven and are allowed to cool for 10 hours by switching off the oven. The samples are then tested within 14 hours.

Electrical Treeing Evaluation

Figure 3:
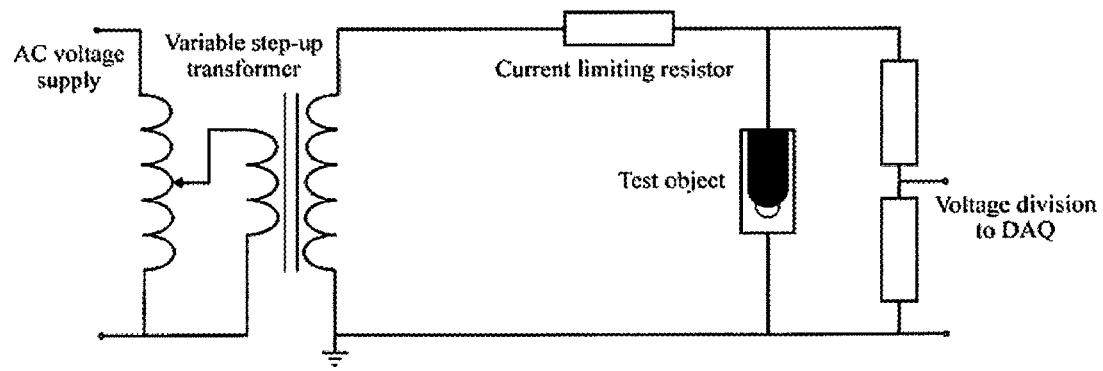
FIG. 3 is a schematic drawing showing a setup for testing the electrical tree initiation field.

Testing of electrical tree initiation field is performed in a setup, illustrated in FIG. 3, under 50 Hz AC voltage ramping regime with a ramp rate of 20 V/s (rms). A 30 kV step-up variable transformer is used as voltage supply. To limit short circuit currents a water resistor of approximately 200 kΩ is connected in series with the tested object.

Figure 4:
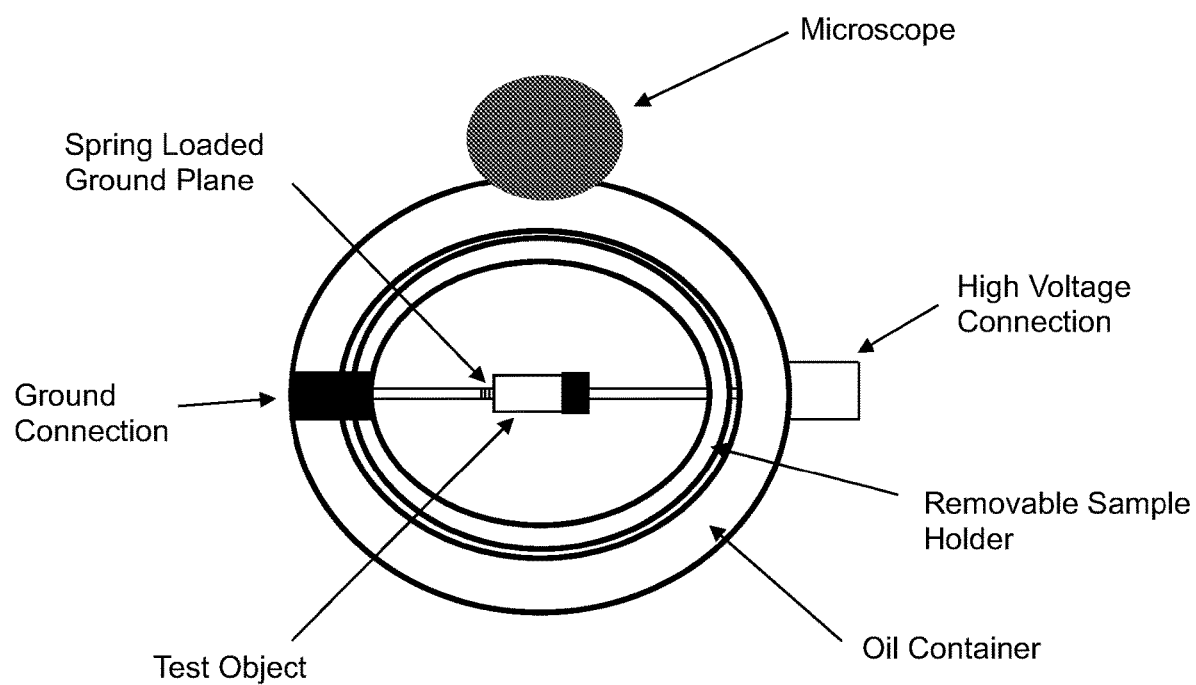
FIG. 4 is a schematic drawing showing a transformer oil in a custom made container with optical detection system.

The electrical tree initiation tests are performed in transformer oil in a custom made container with optical detection system, shown in FIG. 4. The ramp speeds used are measured prior to testing. The treeing process is optically observed using a microscope coupled with a CCD camera, recording the process at 2 frames per second at a resolution of 2048×1532 pixels allowing detection of trees smaller than 10 μm for accurate determination of their initiation. The measurements are performed at ambient conditions.

The tree initiation field strength at the wire electrode is calculated from the applied voltage level using a simplified field enhancement factor of 21 mm$^{-1}$. This factor is calculated using 3D numerical simulations of the maximum electrical field in the test object using a finite element based software, Comsol Multiphysics.

The % improvement of the tree initiation field is calculated from the sum of the scale and the threshold parameter compared to the reference material (CE1) yielded by fitting the dataset to a 3-parameter Weibull distribution, using the maximum likelihood method in the software Minitab® version 16.2.4 in accordance with IEEE Std930TM-2004, "IEEE Guide for the Statistical Analysis of Electrical Breakdown Data". From every test object, four trees were used for calculating the tree inception fields and trees growing in the immediate proximity of visible defects in the material or on the wire electrode were censored.

The gel-content of the crosslinked samples is determined gravimetrically using a solvent extraction technique. The samples (~100 mg) are placed in pre-weighed 100 mesh stainless steel baskets, and extracted in 1.1 dm³ boiling decahydronaphthalene for 6 h. An antioxidant, 10 g Irganox 1076 from BASF, is added to prevent degradation. After 6 h, the solvent is exchanged for 0.9 dm³ new decahydronaphthalene (pre-heated) and the extraction continued for another two hours. The samples are left to evaporate at room temperature for one week under ventilation and finally dried under vacuum for 72 h at 40° C. After this period a constant weight is reached. The non-soluble fraction left in the baskets is weighed, and the gel-content of the polymers is calculated.

Results

From Table 1 it can be seen that the samples have a comparable gel content, thereby a comparable level of crosslinking. Table 2 shows the statistical data 3-parameter Weibull. From Table 3, it can be seen that inventive examples 1 and 2 show significantly increased tree initiation field compared to the comparative compositions.

TABLE 1

|  | CE1 | CE2 (10 mmol/kg) | IE1 (10 mmol/kg) | IE2 (10 mmol/kg) |
|---|---|---|---|---|
| Gel Content [%] | 81.3 | 79.5 | 79.5 | 80.5 |

TABLE 2

|  | Number of failures (trees) | Shape90% confidence levels | | Tree initiation field [kV/mm] | Tree initiation field 90% confidence levels | |
|---|---|---|---|---|---|---|
|  |  | Shape | Lower | Upper | Lower [kV/mm] | Upper [kV/mm] |
| CE1 | 56 | 1.65 | 1.30 | 2.09 | 296 | 289 | 302 |
| CE2 | 60 | 1.78 | 1.31 | 2.41 | 376 | 365 | 388 |
| IE1 | 20 | 3.98 | 1.30 | 12.19 | 509 | 484 | 536 |
| IE2 | 28 | 5.03 | 1.46 | 17.29 | 400 | 385 | 416 |

TABLE 3

| | Conc. [mmol/kg] | Conc. [wt %] | Tree initiation field [kV/mm] | Difference to CE1 [kV/mm] | % Increase from CE1 |
|---|---|---|---|---|---|
| CE1 | — | — | 296 | — | — |
| CE2 | 10 | 0.58 | 376 | 81 | 27 |
| IE1 | 10 | 0.33 | 509 | 214 | 71 |
| IE2 | 10 | 0.63 | 400 | 105 | 35 |

The invention claimed is:

1. A polyolefin composition comprising
    (A) greater than 79 wt % and less than or equal to 99.99 wt % of a cross-linkable polyolefin, and
    (B) 0.01 wt % to 5 wt % of a voltage stabilizer comprising a benzil derivative comprising the structural unit according to the following formula (I):

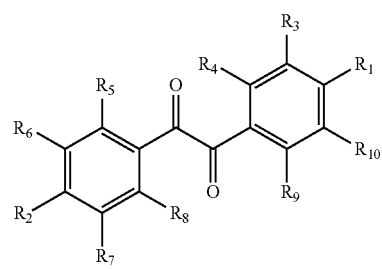

(I)

wherein
$R_1$, $R_2$, $R_3$, $R_4$, $R_5$, $R_6$, $R_7$, $R_8$, $R_9$ and $R_{10}$ independently from each other are hydrogen, or a hydrocarbyl group which may contain heteroatoms or at least two of said $R_1$, $R_2$, $R_3$, $R_4$, $R_5$, $R_6$, $R_7$, $R_8$, $R_9$ and $R_{10}$ together with the ring atoms of the ring system of formula (I) they are attached to, form a further aromatic or non-aromatic ring fused to the ring system of formula (I) and
at least $R_1$ or $R_2$ is an ester group.

2. The polyolefin composition according to claim 1 wherein $R_1$ and $R_2$ are both ester groups.

3. The polyolefin composition according to claim 2 wherein $R_1$ and $R_2$ are the same ester group.

4. The polyolefin composition according to claim 1 wherein the ester group is selected from the group consisting of $CH_3CO_2$—, $C_2H_5CO_2$—, $C_3H_7CO_2$—, $C_4H_9CO_2$—, $C_5H_{11}CO_2$—, $C_6H_{13}CO_2$—, $C_7H_{15}CO_2$—, $C_8H_{17}CO_2$—, $C_9H_{19}CO_2$—, $C_{10}H_{21}CO_2$— and $C_{11}H_{23}CO_2$—.

5. The polyolefin composition according to claim 1 wherein $R_3$, $R_4$, $R_5$, $R_6$, $R_7$, $R_8$, $R_9$ and $R_{10}$ are hydrogen.

6. The polyolefin composition according to claim 2 wherein at least one of $R_3$, $R_4$, $R_5$, $R_6$, $R_7$, $R_8$, $R_9$ and $R_{10}$ is an alkyl group or at least two of said $R_3$, $R_4$, $R_5$, $R_6$, $R_7$, $R_8$, $R_9$ and $R_{10}$ together with the ring atoms of the ring system of formula (I) they are attached to, form a further aromatic ring fused to the ring system of formula (I), and the remaining of $R_3$, $R_4$, $R_5$, $R_6$, $R_7$, $R_8$, $R_9$ and $R_{10}$ are hydrogen.

7. The polyolefin composition according to claim 5 wherein $R_1$ and $R_2$ are $CH_3CO_2$— or $C_{11}H_{23}CO_2$— and $R_3$, $R_4$, $R_5$, $R_6$, $R_7$, $R_8$, $R_9$ and $R_{10}$ are hydrogen.

8. A master batch comprising
    (i) greater than 79 wt % and less than or equal to 99.99 wt % of a cross-linkable polyolefin matrix polymer, and
    (ii) 0.01 wt % to 5 wt % of a voltage stabilizer comprising a benzil derivative (B) comprising the structural unit according to the following formula (I):

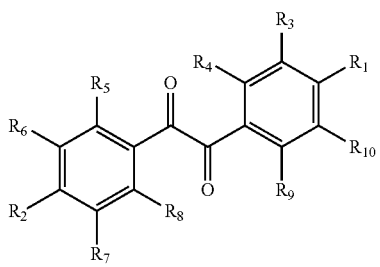

(I)

wherein $R_1$, $R_2$, $R_3$, $R_4$, $R_5$, $R_6$, $R_7$, $R_8$, $R_9$ and $R_{10}$ independently from each other are hydrogen, or a hydrocarbyl group which may contain heteroatoms or at least two of said $R_1$, $R_2$, $R_3$, $R_4$, $R_5$, $R_6$, $R_7$, $R_8$, $R_9$ and $R_{10}$ together with the ring atoms of the ring system of formula (I) they are attached to, form a further aromatic or non-aromatic ring fused to the ring system of formula (I) and at least $R_1$ or $R_2$ is an ester group.

9. A cable comprising a layer made of a polyolefin composition according to claim 1.

10. The cable according to claim 9 wherein the cable is a medium, high or extra high voltage cable comprising an inner semiconductive layer, an insulating layer and an outer semiconductive layer.

11. The cable according to claim 10 wherein at least the insulating layer is made of a polyolefin composition.

12. The polyolefin composition according to claim 3 wherein at least one of $R_3$, $R_4$, $R_5$, $R_6$, $R_7$, $R_8$, $R_9$ and $R_{10}$ is an alkyl group or at least two of said $R_3$, $R_4$, $R_5$, $R_6$, $R_7$, $R_8$, $R_9$ and $R_{10}$ together with the ring atoms of the ring system of formula (I) they are attached to, form a further aromatic ring fused to the ring system of formula (I), and the remaining of $R_3$, $R_4$, $R_5$, $R_6$, $R_7$, $R_8$, $R_9$ and $R_{10}$ are hydrogen.

13. The polyolefin composition according to claim 2, wherein at least two of said $R_3$, $R_4$, $R_5$, $R_6$, $R_7$, $R_8$, $R_9$ and $R_{10}$ together with the ring atoms of the ring system of formula (I) they are attached to, form a further aromatic ring fused to the ring system of formula (I), and the remaining of $R_3$, $R_4$, $R_5$, $R_6$, $R_7$, $R_8$, $R_9$ and $R_{10}$ are hydrogen.

14. The polyolefin composition according to claim 3, wherein at least two of said $R_3$, $R_4$, $R_5$, $R_6$, $R_7$, $R_8$, $R_9$ and $R_{10}$ together with the ring atoms of the ring system of formula (I) they are attached to, form a further aromatic ring fused to the ring system of formula (I), and the remaining of $R_3$, $R_4$, $R_5$, $R_6$, $R_7$, $R_8$, $R_9$ and $R_{10}$ are hydrogen.

15. The polyolefin composition according to claim 1, wherein compound (B) is present in the polyolefin composition in an amount of 0.05 wt % to 4 wt %.

16. The polyolefin composition according to claim 1, wherein the cross-linkable polyolefin comprises hydrolysable silane groups for achieving cross-linking; and wherein the benzil derivative will not react or decompose in the cross-linking.

17. The polyolefin composition according to claim 1, wherein the benzil derivative will not react or decompose in the cross-linking.

18. The polyolefin composition according to claim 1, wherein the cross-linkable polyolefin comprises an unsaturated low density polyethylene homopolymer.

19. The polyolefin composition according to claim 1, wherein the cross-linkable polyolefin comprises an unsaturated low density polyethylene copolymer.

20. A polyolefin composition consisting of
(A) a cross-linkable polyolefin,
(B) a voltage stabilizer comprising a benzil derivative comprising the structural unit according to the following formula (I):

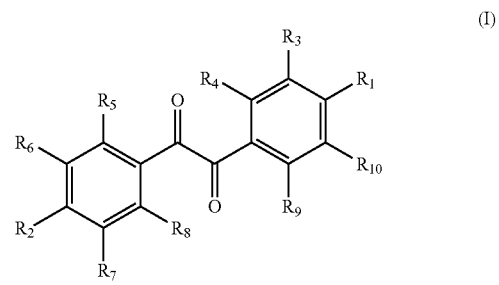

(I)

wherein $R_1$, $R_2$, $R_3$, $R_4$, $R_5$, $R_6$, $R_7$, $R_8$, $R_9$ and $R_{10}$ independently from each other are hydrogen, or a hydrocarbyl group which may contain heteroatoms or at least two of said $R_1$, $R_2$, $R_3$, $R_4$, $R_5$, $R_6$, $R_7$, $R_8$, $R_9$ and $R_{10}$ together with the ring atoms of the ring system of formula (I) they are attached to, form a further aromatic or non-aromatic ring fused to the ring system of formula (I) and at least $R_1$ or $R_2$ is an ester group; and (C) a cross-linking agent in an amount of less than 10 wt % of the polyolefin composition;
(D) a scorch retarder in an amount of 0.005 wt % to 1.0 wt % of the polyolefin composition; and
(E) further additive(s) in a total amount of 0.001 wt % to 5 wt % of the polyolefin composition;

wherein compound (B) is present in the polyolefin composition in an amount of 0.01 wt % to 5 wt %.

* * * * *